United States Patent
Johnsson et al.

(10) Patent No.: US 8,472,343 B2
(45) Date of Patent: Jun. 25, 2013

(54) METHOD AND APPARATUS FOR USE IN A NETWORK

(75) Inventors: Martin Johnsson, Sollentuna (SE); Igor Cananea, Recife (BR); Judith Kelner, Jaboatao dos Guararapes (BR); Djamel Sadok, Jaboatao dos Guararapes (BR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 335 days.

(21) Appl. No.: 12/680,363

(22) PCT Filed: Sep. 28, 2007

(86) PCT No.: PCT/EP2007/060330
§ 371 (c)(1),
(2), (4) Date: May 19, 2010

(87) PCT Pub. No.: WO2009/039892
PCT Pub. Date: Apr. 2, 2009

(65) Prior Publication Data
US 2010/0309817 A1 Dec. 9, 2010

(51) Int. Cl.
*H04L 12/50* (2006.01)
*H04J 3/16* (2006.01)
*G06F 15/177* (2006.01)

(52) U.S. Cl.
USPC ............ 370/254; 370/360; 370/466; 709/220

(58) Field of Classification Search
USPC ............... 370/254–360, 395–403, 445–466; 709/220–224, 231–250
See application file for complete search history.

(56) References Cited

U.S. PATENT DOCUMENTS

| | | | | |
|---|---|---|---|---|
| 4,905,282 A * | 2/1990 | McGlynn et al. | | 380/266 |
| 4,953,210 A | 8/1990 | McGlynn et al. | | |
| 5,289,461 A * | 2/1994 | de Nijs | | 370/360 |
| 5,586,117 A * | 12/1996 | Edem et al. | | 370/466 |
| 6,014,440 A * | 1/2000 | Melkild et al. | | 379/269 |
| 6,125,122 A * | 9/2000 | Favichia et al. | | 370/466 |
| 6,587,874 B1 * | 7/2003 | Golla et al. | | 709/220 |
| 7,054,291 B2 * | 5/2006 | Balazinski et al. | | 370/331 |
| 7,519,393 B2 * | 4/2009 | Bahl et al. | | 455/557 |
| 7,599,302 B2 * | 10/2009 | Vasseur et al. | | 370/248 |
| 7,701,970 B2 * | 4/2010 | Krits et al. | | 370/466 |
| 7,743,121 B2 * | 6/2010 | Boscovic et al. | | 709/221 |
| 7,797,263 B2 * | 9/2010 | Backof et al. | | 706/45 |
| 2002/0062407 A1 | 5/2002 | Tateyama et al. | | |
| 2005/0259674 A1 * | 11/2005 | Cuervo et al. | | 370/422 |

OTHER PUBLICATIONS

Clark, R.J., et al., "Protocol Discovery in Multiprotocol Networks", Computer Communications and Networks, 1995, Computer Soc., US, Sep. 20, 1995, pp. 361-368.
Japanese Office Action from JP2010-526169, dated Jun. 8, 2012, 2 pages.

* cited by examiner

*Primary Examiner* — Man Phan
(74) *Attorney, Agent, or Firm* — Rothwell, Figg, Ernst & Manbeck, P.C.

(57) ABSTRACT

A decentralised method is disclosed of deciding a common configuration parameter in a network. The network comprises at least one node designated to perform the method. In the method, a designated node makes a local decision relating to the configuration parameter in dependence upon information relating to its local operating environment (M3). The designated node sends its local decision to other designated nodes, if any, and receives corresponding local decisions made by other designated nodes, if any (M4). Following such receipt, the designated node makes a common decision relating to the configuration parameter in dependence upon its local decision and the received local decisions (M5). The common decision is made using a decision algorithm common to the designated nodes.

18 Claims, 12 Drawing Sheets

Non existing network

Network without routing

Network with routing

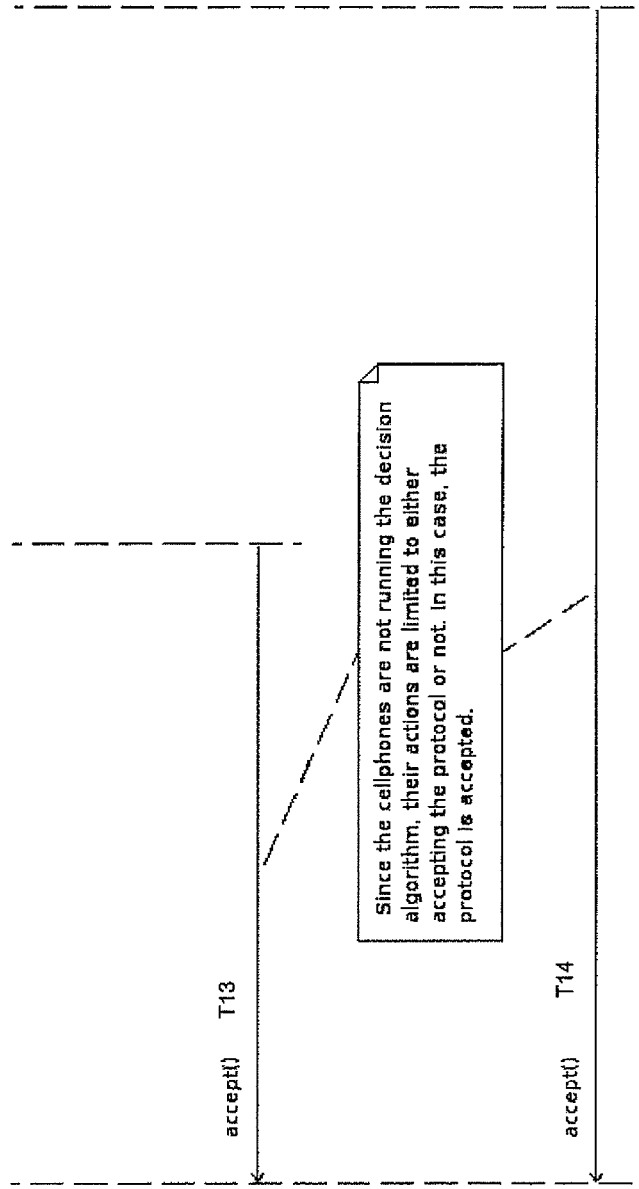

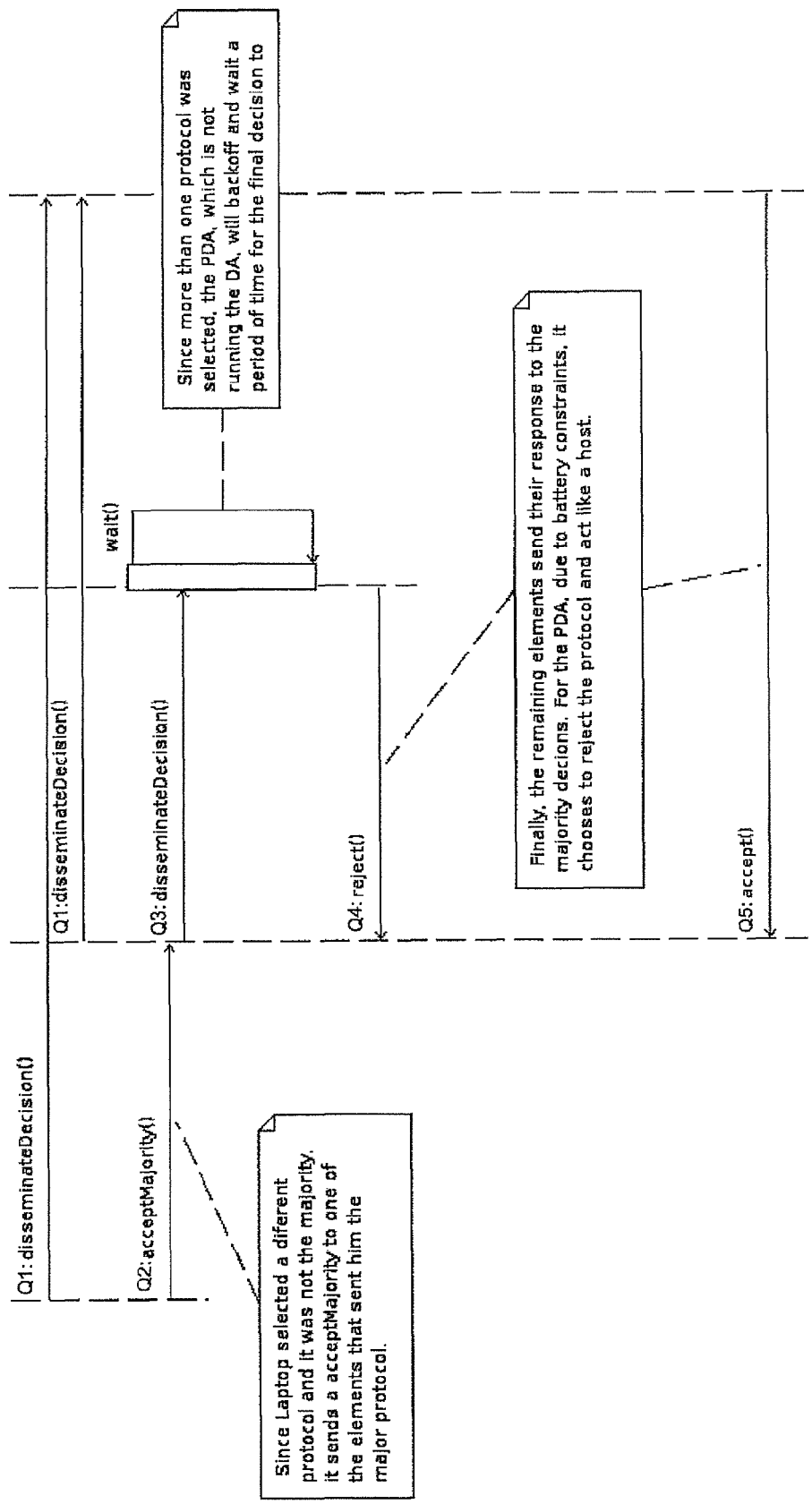

METHOD AND APPARATUS FOR USE IN A NETWORK

CROSS-REFERENCE TO RELATED APPLICATION

This application is a 35 U.S.C. §371 National Phase Application from PCT/EP2007/060330, filed Sep. 28, 2007, and designating the United States.

TECHNICAL FIELD

The present invention relates to a method and apparatus for use in a telecommunications network.

BACKGROUND

In existing networks, a lot of prior knowledge and information, retrieved off-line, is used at the time of configuring different network elements, and this configuration then remains fairly static over time when the network is in operation. This prior knowledge consists of, to mention a few examples, the number of network elements in the network, the topology, the capacities of links and network elements, and QoS characteristics.

In future networking, a whole new dimension of dynamicity is expected. Ambient Networks (AN) is a new networking concept, which aims to enable the cooperation of heterogeneous networks that might belong to different operator or technology domains. This cooperation should be transparent, established on demand, and thus support "plug-and-play" operation, i.e., no previous configuration or negotiation should be required when forming the networks and how they inter-connect to each other.

Ambient Networks (AN) is an integrated project (IP) co-sponsored by the European Commission under the Information Society Technology (IST) priority under the 6th Framework Programme.

This new vision has been studied and developed in the Ambient Networks Project, which is part of the Wireless World Initiative. Ambient Networks is an integrated project co-sponsored by the European Commission under the Information Society Technology priority under the 6th Framework Programme. The project was started in 2004, and is now running in its second phase ending in 2007. It is envisaged that networks based on Ambient Network concepts can be operational starting approximately in the 2012-2015 timeframe, but possibly even earlier.

Of the many concepts that must be created or redefined in terms of Ambient Networking, routing is one of the most important, due to the foreseeable heterogeneous nature of these networks. One and the same network element might be installed and used, at a certain point in time, in a so called ad-hoc network environment, and then later moved and re-installed in a more fixed infrastructure type of network environment. For this type of operating environment, a multi-protocol approach to routing, where a different routing protocol could be used in different operating environments, seems plausible instead of a "one-size-fits-all" single protocol approach.

However, by allowing multiple routing protocols to operate simultaneously, and by implementing multiple protocols for different and even the same environment, an issue arises as to how to choose between the supported protocols so that the information can be routed as efficiently as possible inside and between network domains.

Two approaches that take into consideration a multi-protocol environment are described in [Clark, R., Ammar, M., Calvert, K., Protocol discovery in multiprotocol networks, published online in June 2006 in Mobile and Networks Applications Journal—accessible in http://www.springerlink.com/content/hn3241724163620x] and [F. Bamberger, P. Ford, and J. M. Wing, "Interoperability," section in R&D for the NII: Technical Challenges, report edited by M. K. Vernon, E. D. Lazowska, and S. D. Personick, Interuniversity Communications Council, Inc. (EDUCOM), 1994].

In [Clark, R., Ammar, M., Calvert, K., Protocol discovery in multiprotocol networks, published online in June 2006 in Mobile and Networks Applications Journal—accessible in http://www.springerlink.com/content/hn3241724163620x], a protocol negotiation solution is proposed, that uses a directory service to distribute host information that can be used to identify which protocol must be used. If the directory is not available, the negotiation protocol can probe the communicating peer in order to discover a usable protocol. The approach used therefore mixes probing with directory services in order to support multi-protocol communication.

[F. Bamberger, P. Ford, and J. M. Wing, "Interoperability," section in R&D for the NII: Technical Challenges, report edited by M. K. Vernon, E. D. Lazowska, and S. D. Personick, Interuniversity Communications Council, Inc. (EDUCOM), 1994] presents a survey about interoperability including the establishment of some goals to provide this interoperability. Heterogeneity is presented as a protocol mismatch or as interfaces mismatch. Three possible approaches to resolving or mitigating these problems are also presented.

The first one is the pair-wise approach, where it is supposed to exist a pair of translation functions when a component A wants to communicate with a component B. A pair of functions is needed due to the fact that there must be a translation between A to B messages, and also the inverse way. The second one is a common language approach, where a special language S is used and every component can communicate with it. It can be viewed as a single standard and this approach is the closest to XDNM. The last approach is the broker approach, a hybrid approach where there are third parties, each one understanding some subset of the many protocols used in environments.

[Paul E. McGlynn et al, "Feature negotiation protocol for a synchronous modem", U.S. Pat. No. 4,953,210. Filing date: Feb. 22, 1990. Issue date: Aug. 28, 1990] and [Paul E. McGlynn et al, "Feature Negotiation Protocol and Dynamically Adjustable Retraining Sequence for a High Speed Half Duplex MODEM", U.S. Pat. No. 4,905,282. Filing date: Oct. 19, 1988. Issue date: Feb. 27, 1990] are very specific and focus their proposals on a negotiation of some features between modems to improve the communication through the exchange of some supported features of each modem in order to select better features to the pairs involved in the process to offer a higher throughput or the maintenance of the initially decided configuration established in the modem's standard handshaking sequence.

In [Brian C. Edem et al, "Method and Apparatus Which allows Device with Multiple Protocol Capabilities to Configure to a Common Protocol Configuration", U.S. Pat. No. 5,586,117. Filing date: Jun. 20, 1994. Issue date: Dec. 17, 1996], the authors specify a solution that allows elements in a local network to establish a common protocol to their communication. This document discloses an enforcement process between the two involved nodes. The basic operation of the proposed solution verifies the compatibility of the protocols used by each network element, and if it is the same no changes will be applied, but if each one has a different protocol in operation one of them will be selected as the higher priority station that will determine the protocol to be used. Another restriction is the fact that it only operates in CSMA/CD LANs.

SUMMARY

According to a first aspect of the present invention there is provided a method a decentralised method of deciding a common configuration parameter in a network, the network comprising at least one node designated to perform the method, and the method comprising, at a designated node: making a local decision relating to the configuration parameter in dependence upon information relating to its local operating environment; sending its local decision to other designated nodes, if any; receiving corresponding local decisions made by other designated nodes, if any; and following such receipt, making a common decision relating to the configuration parameter in dependence upon its local decision and the received local decisions using a decision algorithm common to the designated nodes.

The method may comprise receiving from at least one other node of the network information relating to the local operating environment of the at least one other node, and using the received information in making the local decision.

The method may comprise sending the common decision to a node not so designated.

The decision algorithm may comprise adopting the most common local decision made by the at least one designated node.

The step of making a common decision may comprise adopting the decision that is in majority among its own local decision and the received local decisions of the at least one designated node.

The operating environment information for a node may comprise a weight of that node, and the step of making a common decision may comprise adopting the decision made by the at least one designated node having the highest weight.

The configuration parameter may comprise at least one of: a routing protocol for use in the network; a network interface address; a signalling protocol for connection establishment; a protocol for mobility management; a codec; a link layer scheduling algorithm; and a transmission power.

The local operating environment information may comprise at least one of: the protocols supported by the node; a hardware specification of the node, for example processing power and available memory; links and/or interfaces between network nodes, for example addressing information; one or more identities of the node; the number of nodes within the network; state information of the node, for example supported capabilities, media and coding support and enforced policies; default routing parameters; and additional negotiated parameters.

The method may comprise sending the local operating environment information to at least one other designated node for use in performing the method there.

The method may comprise determining whether the sending of the information to the at least one other node would cause the information to cross a domain border, and sending the information only if not so determined.

The method may comprise sending the local operating environment information at predetermined intervals.

The method may comprise sending the local operating environment information in response to a change occurring that affects the local operating environment information.

The method may comprise sending the local operating environment information only to another node within the same domain.

The network may be or relate to or comprise a single domain.

The network may comprise a plurality of nodes designated to perform the method.

All nodes of the network may be designated to perform the method.

The network may comprise an IP network.

The method may comprise performing the steps at each designated node, thus providing an overall system method.

The method may comprise applying the common configuration parameter, for example by establishing a connection in dependence upon the common configuration parameter.

According to a second aspect of the present invention there is provided an apparatus for use as or in a node designated in a network to perform at least part of a decentralised method of deciding a common configuration parameter for the network, the apparatus comprising: means for making a local decision relating to the configuration parameter in dependence upon information relating to a local operating environment of the node; means for sending its local decision to other designated nodes, if any; means for receiving corresponding local decisions made by other designated nodes, if any; and means for making, following such receipt, a common decision relating to the configuration parameter in dependence upon its local decision and the received local decisions using a decision algorithm common to the designated nodes.

The apparatus may comprise means for receiving from at least one other node of the network information relating to the local operating environment of the at least one other node, and wherein the received information is used in making the local decision.

The apparatus may comprise means for sending the common decision to a node not so designated.

The means for making the common decision may be arranged to adopt the most common local decision made by the at least one designated node.

The means for making the common decision may be arranged to adopt the decision that is in majority among its own local decision and the received local decisions of the at least one designated node.

The operating environment information for a node may comprise a weight of that node, and the means for making the common decision may be arranged to adopt the decision made by the at least one designated node having the highest weight.

The apparatus may comprise means for sending the local operating environment information to at least one other designated node for use in performing the method there.

The apparatus may comprise means for determining whether the sending of the information to the at least one other node would cause the information to cross a domain border, and means for sending the information only if not so determined.

The apparatus may comprise means for applying the common configuration parameter, for example by establishing a connection in dependence upon the common configuration parameter.

According to a third aspect of the present invention there is provided a decentralised system for deciding a common configuration parameter for a network, the system comprising, at each of at least one designated node of the network: means for making a local decision relating to the configuration parameter in dependence upon information relating to its local operating environment; means for sending its local decision to other designated nodes, if any; means for receiving corresponding local decisions made by other designated nodes, if any; and means for making, following such receipt, a common decision relating to the configuration parameter in dependence upon its local decision and the received local decisions using a decision algorithm common to the designated nodes.

The system may comprise, at each designated node, means for receiving from at least one other node of the network information relating to the local operating environment of the at least one other node, and using the received information in making the local decision.

The system may comprise, at each designated node, means for sending the common decision to a node not so designated.

According to a fourth aspect of the present invention there is provided a program for controlling an apparatus to perform a method according to the first aspect of the present invention or which, when loaded into an apparatus, causes the apparatus to become an apparatus according to the second or third aspect of the present invention. The program may be carried on a carrier medium. The carrier medium may be a storage medium. The carrier medium may be a transmission medium.

According to a fifth aspect of the present invention there is provided an apparatus programmed by a program according to the fourth aspect of the present invention.

According to a sixth aspect of the present invention there is provided a storage medium containing a program according to the fourth aspect of the present invention.

BRIEF DESCRIPTION OF THE DRAWINGS

FIGS. 6A to 6C illustrate an example sequence of actions performed by the devices of FIG. 5 in an embodiment of the present invention;

FIGS. 8A and 8B illustrate an example sequence of actions performed by the devices of FIG. 7 in an embodiment of the present invention;

DETAILED DESCRIPTION

Figure 1:
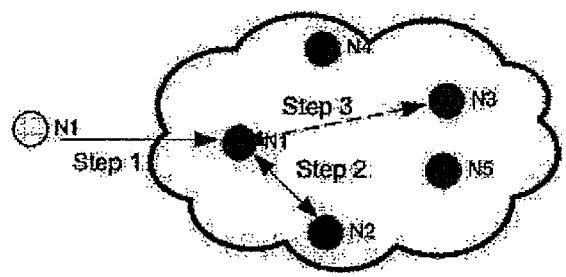
FIG. 1 is for use in illustrating an example operation of an embodiment of the present invention.

As explained above, dynamic configuration of network elements is today very limited, and the main reason for this limitation is that networks have no ability to become "self-aware" about their own configuration as well as their environment. This knowledge resides most often in centralized management systems from which network elements get populated with configuration information.

Some few exceptions where dynamic configuration is supported are the creation of the routing tables in routers using some sort of routing protocol, and for the configuration of IP addresses in hosts using a host configuration protocol.

However, these few examples operate in well-controlled network environments, where network topology and the distribution of certain functionality onto different network elements are known prior to the operation of a routing protocol or a host configuration protocol.

In future networks, one cannot assume that a network topology and the distribution of functionality is known beforehand. Moreover, network topology and functionality might (rapidly) change, and thus there could be needs for on-demand and real-time re-configuration of network elements due to changes in the operational environment.

None of the above-presented papers and patents focus on the problem of the negotiation between network elements in order to verify the possible environments and select the best one considering the available technologies and protocols of the nodes to make available a communication infrastructure, that can support heterogeneous elements, in an easier and more automatic way. An embodiment of the present invention aims to address these short-comings of the current state-of-the-art by defining a novel method that can be used to dynamically select and configure network elements as the network operating environment becomes known to them via a dissemination, negotiation, and decision scheme.

A solution according to an embodiment of the present invention uses what is termed herein an "Extensible Network Environment Discovery and Negotiation Method" (XDNM) to select and decide, based on some set of information disseminated via XDNM, what would be the best routing protocol to use. The protocol could also decide if either intra-domain routing, or inter-domain routing should be employed across an interface between network elements.

XDNM is clearly not restricted in scope to be used only as a "meta-protocol" to select an appropriate routing protocol, but can also be a "meta-protocol" serving to be used as a basis for other real-time configurations of network elements.

In the following description, the basic concept of an embodiment of the present invention is expressed in terms of selecting an appropriate routing protocol, but as explained above, the invention can be used for selecting and deciding upon other configuration parameters. Examples could be network interface addresses, signalling protocols for connection establishment, and protocols for mobility management.

Typical situations where XDNM can be applied are the configuration of functionalities and protocols to be used by nodes in a network without any previous configuration in any element. The configuration of such functionalities are made possible by the features of XDNM of becoming "self-aware" of the network operating environment.

Some example uses of XDNM, besides the specific examples further elaborated below, are the negotiation of a codec that a video application must use to improve network resources utilization, link layer scheduling algorithms to avoid collision of transmitted data, and the radio power to be used in order to improve battery lifetime.

With respect to routing protocols, XDNM enables a decision as to what the best routing protocol to be used is, based on information regarding the current operating environment.

This operating environment information could consist of, but is clearly not restricted to, the following:
- the protocols supported by the network elements,
- a hardware specification of the network elements, e.g. expressed in terms of processing power and available memory.
- information about links/interfaces between network elements, including addressing information
- identities of network elements (and which could potentially equal an address prefix) (*)
- the number of network elements within a domain
- the "weight" of each network element
- state information of each of the participant nodes including supported capabilities, media and coding support and enforced policies.
- default routing parameters.
- additional parameters that can optionally be negotiated.

It would be usual for the information marked above with an asterisk (*) to be compulsory in an implementation of XDNM.

XDNM can be considered to operate in three basic phases:
1. Discovery: Each network element disseminates to other network elements in a network its own local operating environment information.
2. Negotiation: Each network element being capable of making (designated to make) decisions makes a local (or interim) decision relating to one or more configuration parameters using its own local decision algorithm. This decision is disseminated to other network elements in the network.
3. Decision: Each designated decision-making network element will, upon reception of local decisions being made by other such designated network elements, execute the same predefined common decision algorithm which will select and make one common decision for the network; this is of importance as each such network element may have made a different local decision.

A scenario that can illustrate a complete XDNM operation is the following (described with reference to FIG. 1): a network element N1 arrives in a wireless network and its WLAN interface detects a signal from network element N2. Through XDNM, N1 and N2 will mutually discover their local operating environment by transmitting such type of information as listed above. N1 and N2 could then, also via XDNM, negotiate and decide, and finally configure, what radio transmission power to use.

After this initial phase, a second negotiation and decision "level" may be initiated to acquire and configure an address that allows the entrance of N1 into the network. Then N1 will request a service (a videoconference session with node N3, for example) and should verify if it is possible to connect directly with the desired service (and which is done by means other than XDNM). If it is not possible, it becomes necessary to start another negotiation to configure the routing protocol that will be used to allow the communication with N3 (and possibly other network elements).

For the protocol negotiation, information about the supported protocols and other parameters regarding the operating environment are exchanged between the network elements and a decision is made according to some preconfigured policy. Examples of such a policy could be, but not limited to, a majority decision, a weighted decision or a default protocol (see the further description below).

For the example when XDNM is being used for negotiating a routing protocol, one of the following six possible scenarios could be decided:

1. No routing is required. Basic connectivity will suffice.
2. Routing is required and a suitable intra-domain protocol is chosen.
3. A new protocol is chosen to replace the current one.
4. Protocol translations are employed between domains (which always occurs within a network element; this is not further described herein).
5. An inter-domain routing protocol is to be used (occurs at domain borders).
6. Network element is not willing to route. Forward packets to a peer that can route the packets (a local decision which is made in conjunction with negotiating the routing protocol to be used in a network by those network elements being capable of routing).

To speed up negotiation, especially in less capable devices, XDNM can rely on the existence of a default routing protocol that could be used in many different types of operating environments with a high level of efficiency, albeit perhaps not as efficiently as an environment-tailored routing protocol.

An embodiment of the present invention will now be described in more detail with reference to FIGS. 4A and 4B, in terms of a plurality of different phases, with each phase consisting of a number of computational steps. These phases and the computational steps are further described under separate headings below. The description assumes that the network elements are deployed in a stable network environment and that all elements are active. This may not be the case for networks where mobility and wireless links are present, but the described steps can also be applied to these types of network environments. When necessary, comments regarding mobility will be made in the description of the steps.

The distribution of operating environment information in an embodiment of the present invention will now be described in more detail.

Figure 4A:
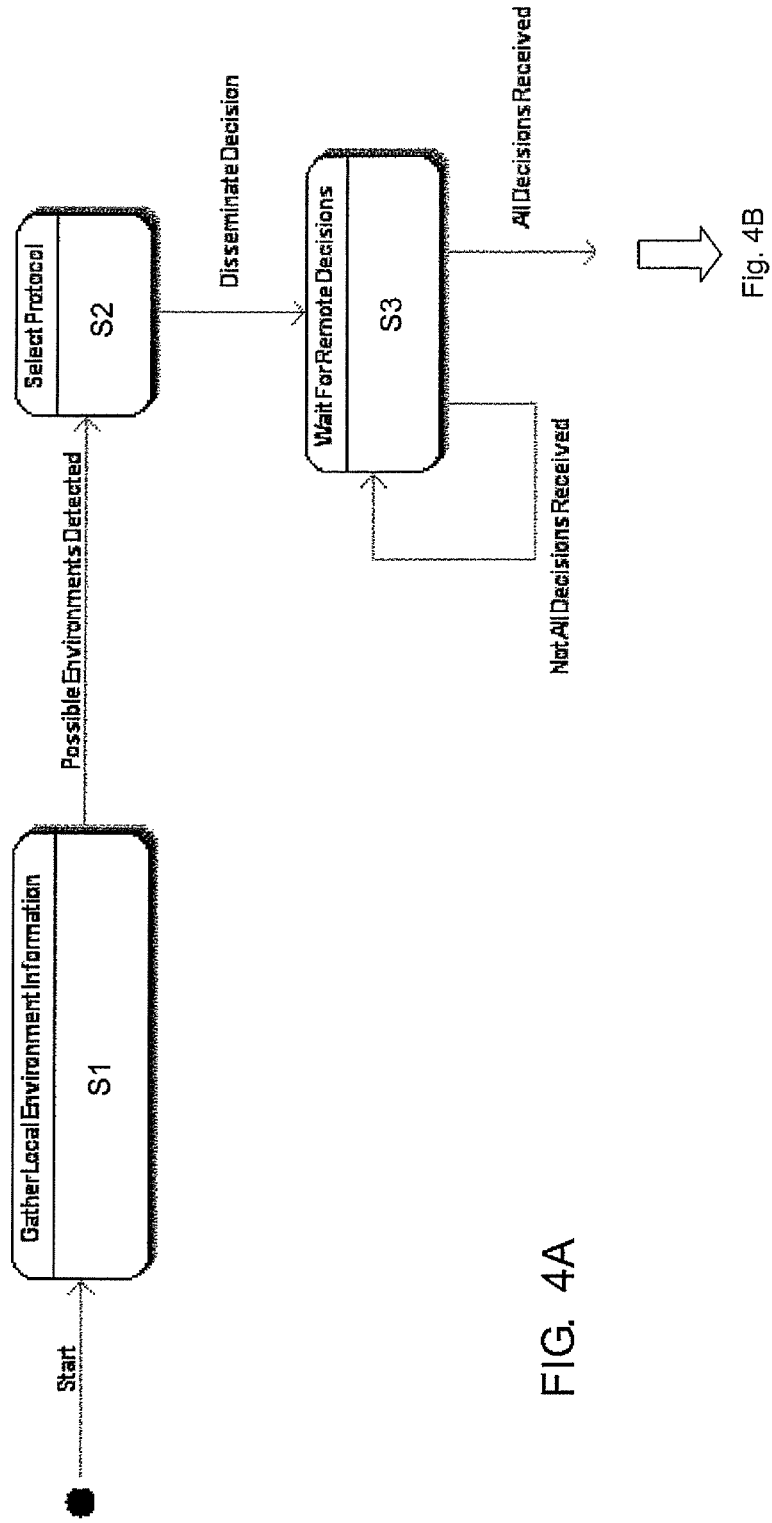
FIGS. 4A and 4B illustrate steps performed by a network node according to an embodiment of the present invention.

Each network element in a domain has the responsibility to distribute to each of the other network elements in the domain, examples of the local information about the operating environment being as described previously; this is represented by step S1 ("GatherLocalEnvironmentInformation" state) of FIG. 4A. "Local" in this context refers to information specific and delimited by one network element, and which also includes the interfaces and the links by which that network element is connected to other network elements within a domain.

The particular distribution mechanism for distributing operating environment information between network elements is not important and is not further described herein.

Distribution of the local operating environment information can be performed in different ways, and also limited to save network resources; for example the information could be distributed only towards the network element(s) running the decision algorithm, and/or only from a subset of the network elements.

Figure 2A:
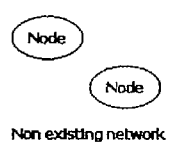
FIGS. 2A to 2C illustrate three different types of network status.
Figure 2B:
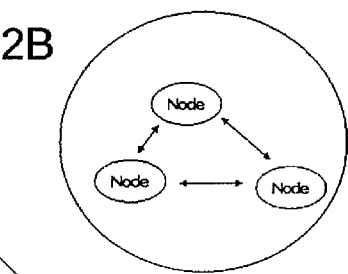
Figure 2C:
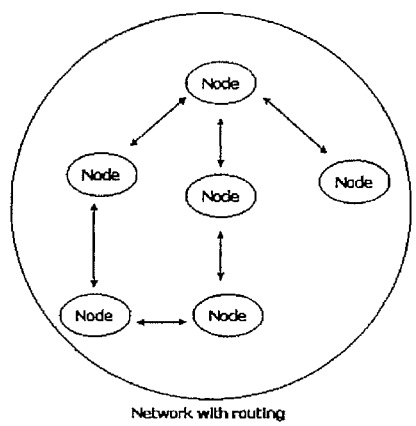

FIGS. 2A to 2C illustrate some possible network statuses. In the simplest case, as illustrated in FIG. 2A, no network exists and the decision process will take place on both nodes. FIG. 2B illustrates the next case, where a network is formed but no routing protocol is being used. This could be the case, but is not limited to, where no suitable routing decision has been made. FIG. 2C illustrates the final case, which is a fully-formed network, and which also corresponds to a domain in this context, with an established routing protocol, which has been chosen for example as a result of operating an embodiment of the present invention.

The distribution of the operating environment information enables the network element(s) which is/are responsible to run the environment decision algorithm (an integral part of XDNM) to have up-to-date operating environment information available from network elements in a domain.

Due to dynamics further elaborated below, distribution of operating environment information can be done both periodically and possibly also instantly if a change has occurred that affects the operating environment information.

In networks making use of wireless links, connectivity might come and go frequently. This could result in that not all network elements may be reachable from every other network element. In this case, these elements are unable to disseminate their operating environment information and would not take part in the decision process. These network elements can later take part of an established network.

Domain border detection in an embodiment of the present invention will now be described in more detail.

The distribution of operating environment information would generally not reach network elements outside a domain. A domain border can be characterized by a boundary such as between address areas, security constraints, and administrative and/or ownership responsibilities. Thus, the distribution mechanism should generally start by identifying whether by sending information across a certain interface/link implies the crossing of a domain border. Identifying a domain border can be achieved by for instance exchanging address prefix information and/or some kind of network (element) identities. If and when a domain border has been detected, there should generally not be any further exchange of operating environment information across that interface/link.

It should be observed that a network element might belong to several domains at the same time. In such cases, the network element should be properly configured to ensure that operating environment information is not traversing domain borders which are located within the network element itself.

When detecting a domain border, the decision is generally to run an inter-domain routing protocol between the domains.

The decision algorithm (local and common) in an embodiment of the present invention will now be described in more detail.

One or more network elements, possibly all, within a domain, will have the responsibility to run a decision algorithm which ultimately results in that one routing protocol is selected to run for that domain (which also includes the option that no routing protocol shall be used), and they may only choose among those routing protocols that were specified as part of the distribution of operating environment information. The selection of the routing protocol can take into consideration, but is not limited to, the operating environment information listed above.

An example selection process could involve a cellular phone that has GSM, WCDMA, Bluetooth and WLAN interfaces and the supported routing protocols.

Figure 3:
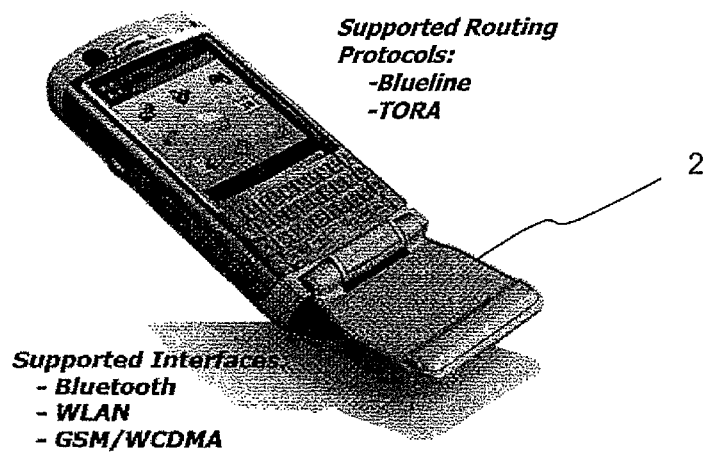
FIG. 3 illustrates an example device for use with an embodiment of the present invention having certain supported interfaces and routing protocols.

FIG. 3 shows a possible device 2. The selection of the protocol in this case could be based on the interface currently being used: the Blueline protocol if the Bluetooth interface is used or the TORA protocol if any of the other interfaces are used.

Each network element having this responsibility first makes its own (local) decision, using the network element's own decision algorithm; this is represented by step S2 of FIG. 4A ("SelectProtocol" state). If more than one network element runs the decision algorithm, they must also inform each other about their local decisions, and wait to receive the remote decisions of others; this is represented by step S3 of FIG. 4A ("WaitForRemoteDecisions" state).

Figure 4B:
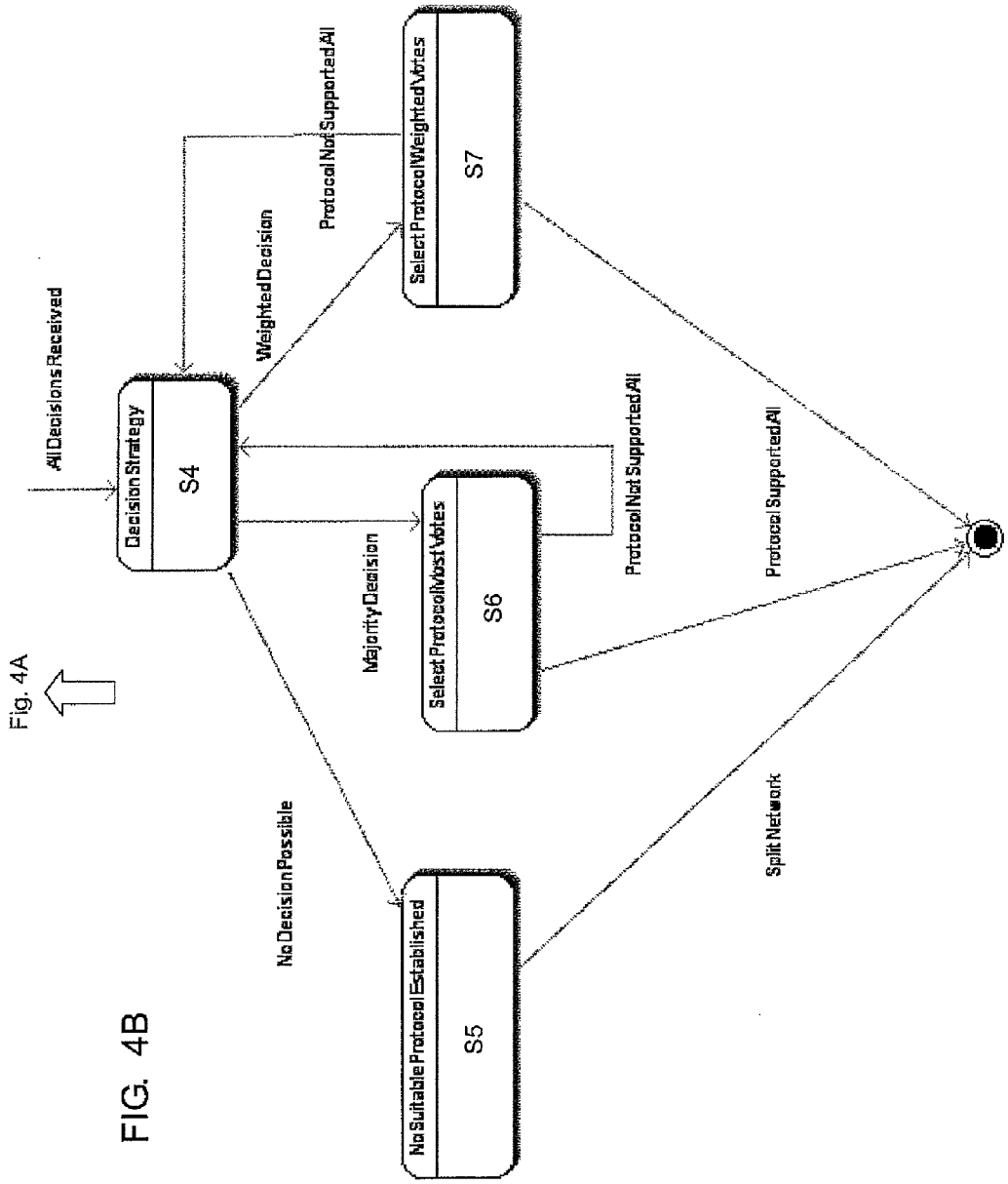

In the case where the different network elements running their local decision algorithms have come to different decisions from the available set of routing protocol options, they need to collectively agree on one uniform and common decision; this is represented by step S4 of FIG. 4B ("Decision Strategy" state). This can be achieved in a variety of different ways, and some examples are described below. Nodes being capable of running the local decision algorithm and taking part in the common decision use the same logic for calculating the common decision, therefore the common decision procedure should be preconfigured, and/or a default procedure is followed.

Majority decision: In this case, the decision is based on the local decision made by the majority of the network elements running the decision algorithm. Majority in this example means that more than 50% of those network elements have made the same decision, and this is then also agreed to be the decision accounted for the whole domain; this is represented by step S6 of FIG. 4B ("SelectProtocolMostVotes" state).

Weighted decision: In this case, the decision accounted for the whole domain is to select the routing algorithm selected by the network element running the decision algorithm having the highest "weight". If several network elements have the same weight, and which also is the highest, but where the decisions of each of these are not uniform, one could then in addition make a majority decision among those (with highest weight) as described in the previous alternative; this is represented by step S7 of FIG. 4B ("SelectProtocolWeightedVotes" state).

It will be appreciated that these are merely examples of how the common decision is arrived at. For example, the most common local decision could also be selected as the common decision, and other forms of decision logic would be readily apparent to the skilled person.

Where one consistent, coherent decision not possible: If the common decision would not result in a uniform decision to be accounted for the whole domain, one needs to consider alternatives such as splitting the domain; this is represented by step S5 of FIG. 4B ("NoSuitableProtocolEstablished" state). An alternative would be to fall back to a default routing protocol.

Disseminating the decision about the selected routing protocol: Once one or more network elements executing the Decision Algorithm have selected a routing protocol, at least one of these network elements will disseminate the information about the selected routing protocol to all other network elements in the domain.

Aspects of dynamics of a domain: A domain is by no way static, and an embodiment of the present invention supports the possibility of that network elements can enter and leave the domain at any point in time (possibly due to intermittent connectivity). In this case, after disseminating the operating environment information, the decision algorithm takes place and will check if the current routing protocol can be used by the new network element. Effectively, this means that the decision algorithm may run continuously and may re-evaluate and also change a previously made decision due to these dynamics. The frequency by which is a previous decision is re-evaluated, is subject both to possible policies as well as to avoid system instabilities and unwanted oscillations.

Usually, it would be assumed that all decision-making network elements have received all information. What happens in the event that a network instability of some sort arises, which prevents such an element from receiving information temporarily, is beyond the scope of this disclosure. However, in brief, multiple (re-)transmissions could be employed in such a situation, possibly in combination with acknowledgements being sent back to the transmitting network elements.

If there would still be inconsistencies in the decision making (which, even in highly dynamic network environments is quite unlikely to occur), it might be declared that the network is not stable and should undergo fragmentation/splitting. Thus, if some network element would possibly receive information about different common decisions, an error condition could be raised.

Other aspects: There could be a case where a network element chooses to not perform routing. A typical example would be hosts that belong to a network that has a dedicated router. In this case, the network elements would forward all packets to the router, which would be responsible for accordingly routing the data. A network element acting as a router would inform its neighbours in the domain that it takes this role.

Another case is where the network elements involved in making a decision come to a decision that a particular routing protocol should be used, but where that protocol is currently not supported by all the necessary network elements. Instead of leaving those network elements out of the routing loop, a network element having the decided routing protocol installed can see to it that this protocol gets installed into each of the other network elements which lack the selected routing protocol.

Figure 9:
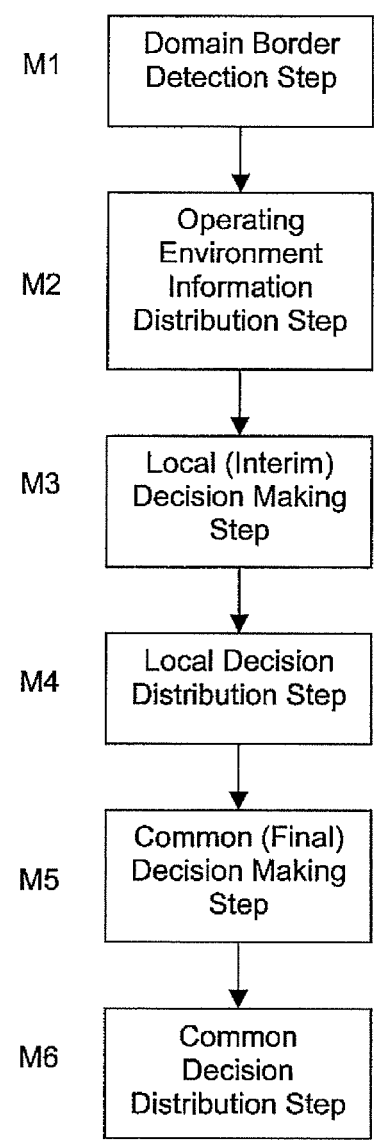
FIG. 9 is a schematic flowchart illustrating the steps performed in an embodiment of the present invention.

In overview, a method according to an embodiment of the present invention is summarised in FIG. 9. The method comprises a domain border detection step M1, an operating environment information distribution step M2, a local decision making step M3, a local decision distribution step M4, a common decision making step M5, and a common decision distribution step M6.

Figure 10:
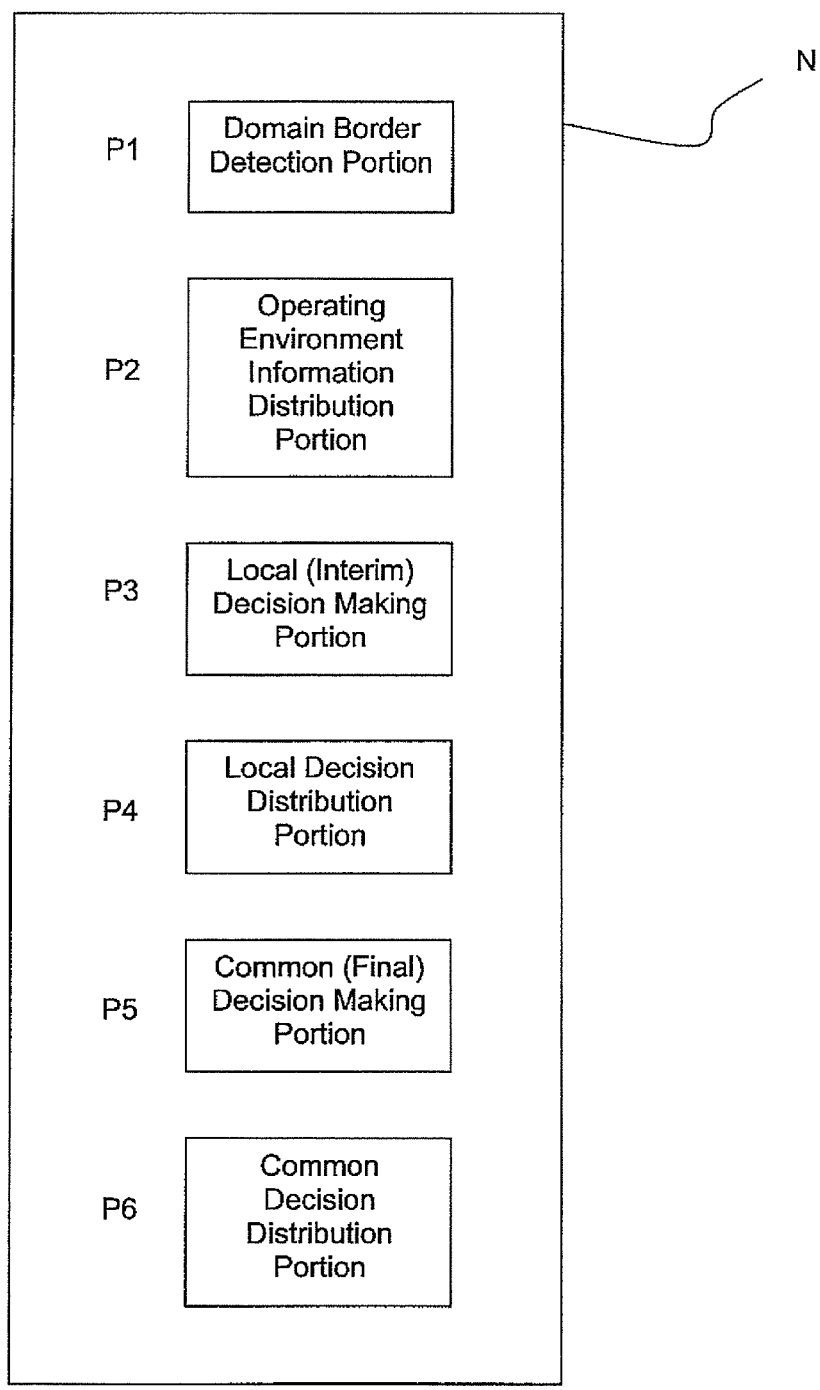
FIG. 10 is a schematic block diagram illustrating parts of a device embodying the present invention.

A node N according to an embodiment of the present invention is illustrated schematically in FIG. 10, comprising respective portions for performing the steps illustrated in FIG. 9. Specifically, the node N comprises: a domain border detection portion P1 for performing the domain border detection step M1; an operating environment information distribution portion P2 for performing the operating environment information distribution step M2; a local decision making portion P3 for performing the local decision making step M3; a local decision distribution portion P4 for performing the local decision distribution step M4; a common decision making portion P5 for performing the common decision making step M5; and a common decision distribution portion P6 for performing the common decision distribution step M6. It will be appreciated that the general step of distributing can include within it the steps of requesting, sending and receiving.

The construction and operation of the parts shown in FIGS. 10 and 11 will be clear from the previous description, and that which follows.

An embodiment of the present invention in the context of a Personal Area Network will now be described with reference to FIGS. 5 and 6.

Figure 5:
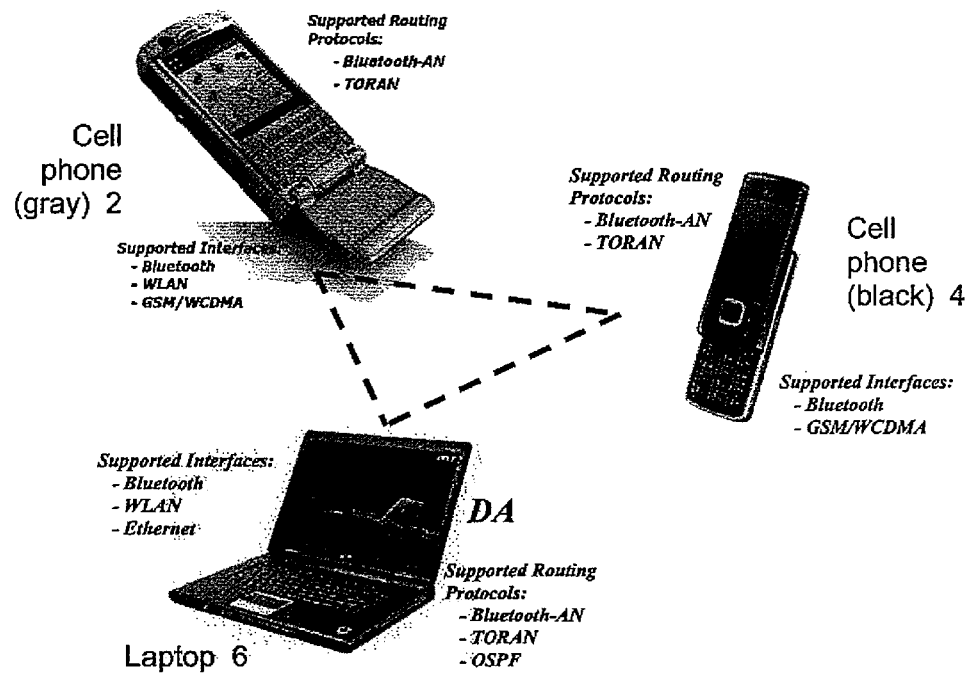
FIG. 5 is for use in illustrating an example where three devices operate according to an embodiment of the present invention to select a routing protocol for a Personal Area Network (PAN)

FIG. 5 illustrates three devices booting up using the proposed method (XDNM) as described above. The devices comprise a laptop 6, and two cell phones 2 and 4 (identified here as "gray" 2 and "black" 4). All devices exchange operating environment information via one of the available interfaces, but only the laptop in this example is designated to run the Decision Algorithm (DA).

Using the received information, the laptop 6 decides to use the Bluetooth-AN protocol, as all devices have that routing protocol supported, and also due to a factor in the algorithm to save battery power for smaller devices participating in routing.

Figure 6A:
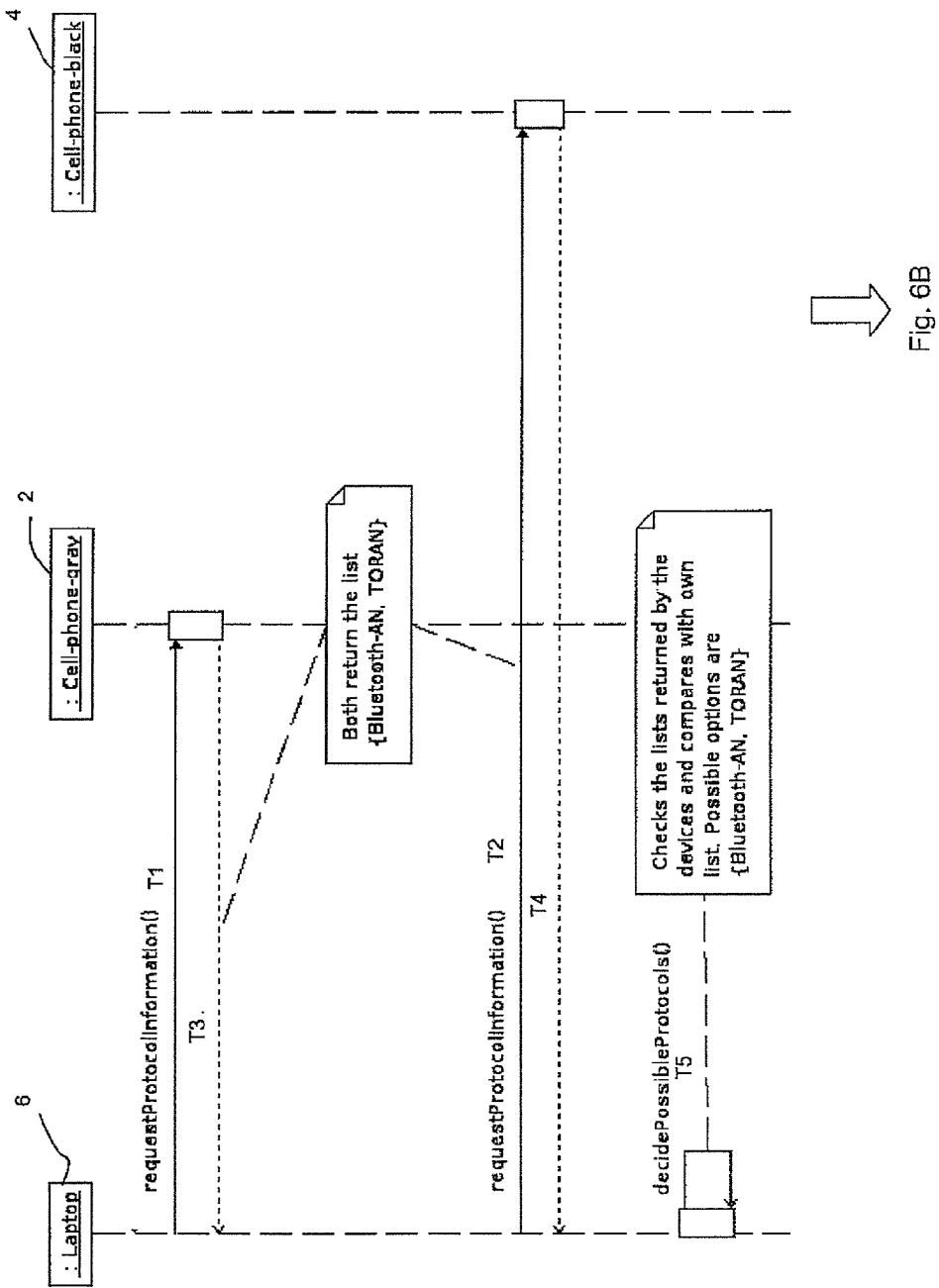
Figure 6B:
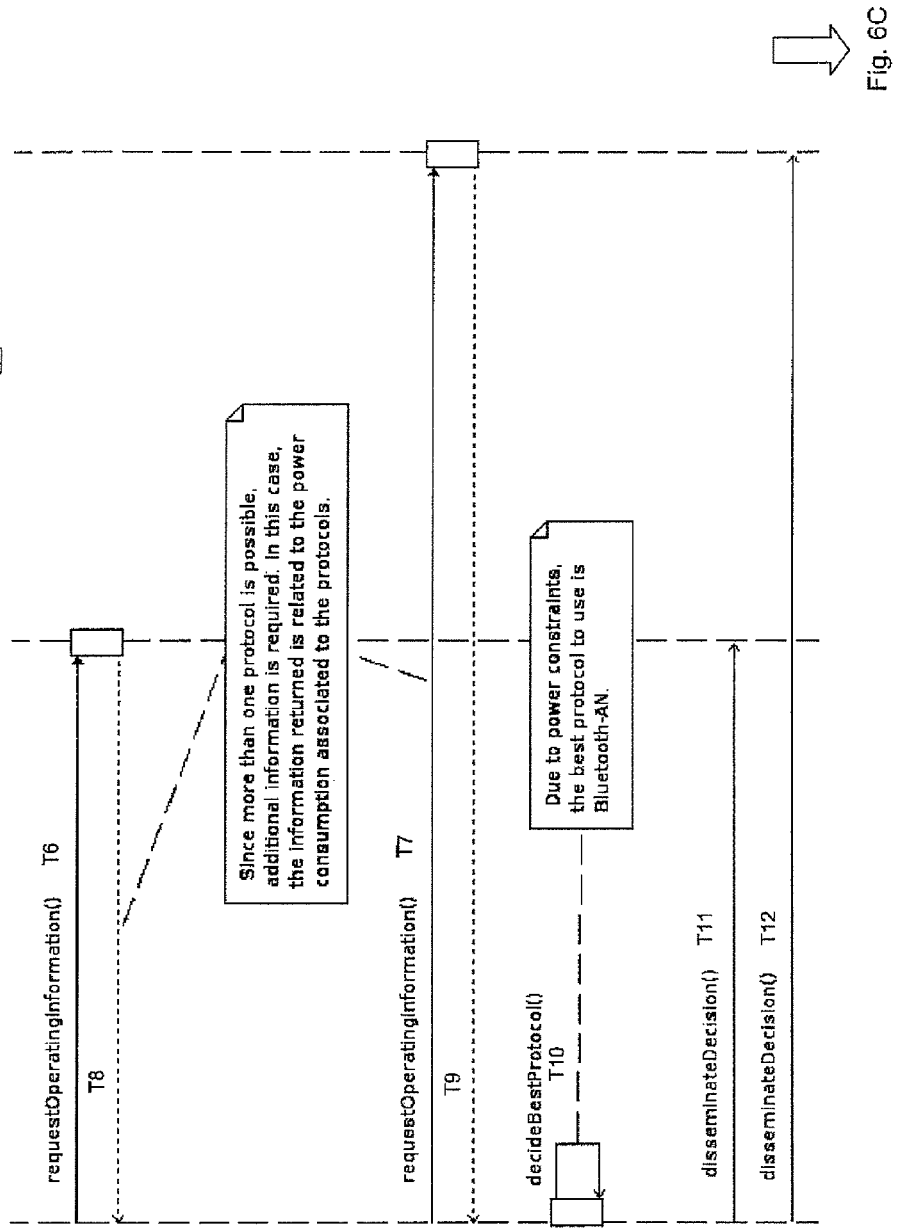

The sequence of actions and descriptions of why and how they were taken are illustrated in FIGS. 6A to 6C and described in more detail below. It will be appreciated that the actions depicted in FIGS. 6A to 6C are summarized, but comprise the most relevant actions taken as part of executing XDNM.

In steps T1 and T2 the laptop 6 requests operating environment information from the gray and black cell phones 2 and 4 respectively, specifically as to what routing protocols they support. This information is provided by the gray and black cell phones 2 and 4 respectively in steps T3 and T4; both return the list {Bluetooth-AN, TORAN}.

In step T5 the laptop 6 attempts to decide on the routing protocol to be used. Since the laptop 6 itself supports protocols from the list {Bluetooth-AN, TORAN, OSPF}, there is more than one protocol that is common to all devices: {Bluetooth-AN, TORAN}.

Due to this, the laptop 6 requests additional operating environment information from the gray and black cell phones 2 and 4 respectively in steps T6 and T7, specifically as to the power consumption associated with the supported routing protocols. This information is provided by the gray and black cell phones 2 and 4 respectively in steps T8 and T9.

In step T10 the laptop 6 uses the additional operating environment information received from the gray and black cell phones 2 and 4 to decide that the best protocol to use is Bluetooth-AN. This decision is disseminated to the gray and black cell phones 2 and 4 respectively in steps T11 and T12.

Relating the above to the overview method diagram of FIG. 9 as described above, the domain border detection step M1 of FIG. 9 is not explicitly required since it is known that the nodes relate to the same domain.

The operating environment information distribution step M2 of FIG. 9 corresponds to steps T1 to T4 and T6 to T9 (the distribution is carried out in two stages). The laptop 6 also shares its own operating environment information with the cell phones 2 and 4 (although the steps required to perform this sharing are not explicitly shown).

The local decision making step M3 of FIG. 9 corresponds to steps T5 and T10 (the decision is taken in two stages).

Since the laptop 6 is the only designated decision-making node, there is no need for the local decision distribution step M4 or the common decision making step M5 (the local decision is equivalent to the common decision).

The common decision distribution step M6 corresponds to steps T11 to T14.

An embodiment of the present invention in the context of a Home area network will now be described with reference to FIGS. 7 and 8.

Figure 7:
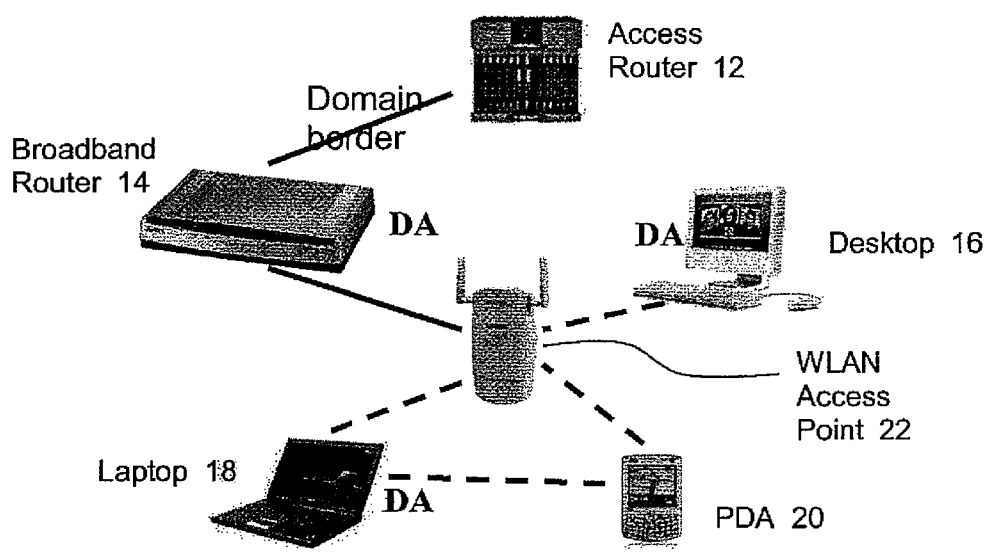
FIG. 7 is for use in illustrating an example where six devices operate according to an embodiment of the present invention to select a routing protocol for a Home Access Network.

FIG. 7 illustrates a home area network with five different devices (a Broadband router 14, WLAN Access Point 22, Laptop 18, Desktop 16 and PDA 20), as well as another device (an Access router 12) residing in the access network on the other side of a domain border. All devices in FIG. 7 run the proposed method (XDNM), while three of the devices in the home area network are also designated to run the Decision Algorithm (DA), as marked on FIG. 7.

In the table shown below, there is an overview of the supported interfaces as well as supported routing protocols for each of the devices in FIG. 7. It is to be noted that FIG. 7 depicts one specific configuration of used interfaces, i.e. not all the supported interfaces as listed are in use in this specific configuration. It is also assumed that the devices running the DA have equal weight, and are in this example using a majority common decision algorithm.

| Device | Supported Interfaces | Supported routing protocols |
|---|---|---|
| Access router 12 | Fixed Ethernet | OSPF, BGP, TORAN |
| Broadband router 14 | Fixed Ethernet | OSPF, TORAN |
| WLAN AP 22 | Fixed Ethernet, WLAN | TORAN, OSPF |
| Laptop 18 | Fixed Ethernet, WLAN, Bluetooth | TORAN, Bluetooth-AN |
| Desktop 16 | Fixed Ethernet, WLAN | TORAN, Bluetooth-AN |
| PDA 20 | WLAN, Bluetooth-AN | TORAN, Bluetooth-AN |

Figure 8A:
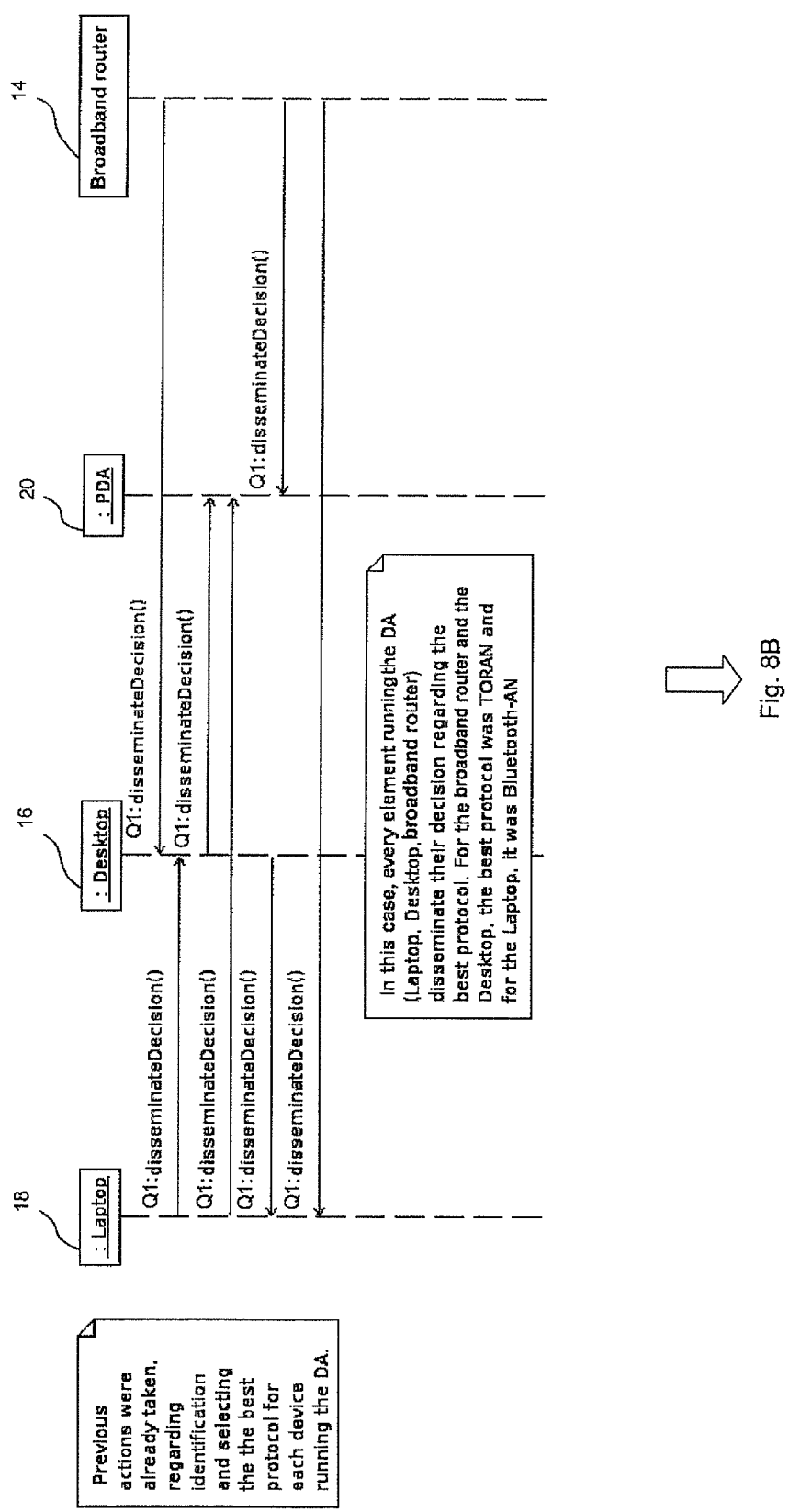

Some steps of the method performed by the various elements are illustrated in FIGS. 8A and 8B, and these will be described below. Some initial steps, not shown in FIGS. 8A and 8B, will first be described.

The domain border will be identified via XDNM (corresponding to step M1 of FIG. 9), e.g. by transmitting information that identifies network or node/device identities. In this case, this will cause no further information via XDNM to be transmitted between the access and the broadband router 12 and 14, and will also, in this specific case, cause no routing protocol to be used across the link.

For the home area network, information is disseminated about supported (and used) interfaces, as well as what routing protocols are supported by each of the devices (corresponding to step M2 of FIG. 9). Execution of the DA in the broadband router 14 and in the desktop 16 (corresponding to step M3 of FIG. 9) results in a local decision in both of these nodes that the TORAN protocol shall be used, whereas execution of the DA in the laptop 18 results in a local decision that Bluetooth-AN shall be used (with the laptop 18 offering free download of the Bluetooth-AN protocol to all other devices in the home area network).

In step Q1 the local decision taken in each designated decision-making node is disseminated to each other designated decision-making node (corresponding to step M4 of FIG. 9).

Then, in each designated decision-making node a common decision is made based on the set of local decisions (comprising the local decision of the node concerned and the local decisions received from the other designated decision-making nodes); this corresponds to step M5 of FIG. 9. In this case, a majority decision is taken, such that the TORAN protocol is selected as the routing protocol.

The laptop 18 decided upon a different protocol to the one that resulted from running the common decision making algorithm, and in step Q2 it informs a certain one of the other designated decision-making nodes (in this example, the desktop 16) that it accepts the majority decision made by that node. In step Q5 the broadband router 14 also notifies its acceptance of the decision to the desktop.

Since the PDA 20 is not running the DA, it does not yet know of the routing protocol decision reached by the decision-making nodes. In step Q3 the common decision is notified to the PDA 20 (corresponding to step M6 of FIG. 9), which is waiting for a common decision to be notified to it. In this example, the PDA 20 decides, due to power constraints and to save battery power, to reject the common decision and act as a host, not using any routing protocol, and this decision is notified to another node in step Q4.

In summary, an embodiment of the present invention defines a method, known herein as XDNM, which can be used to support networks (such as IP networks) which can be made self-configuring. By disseminating local operating environment information between network elements, the network elements in a network can make own but collectively agreed decisions on how to properly configure the network elements with e.g. different protocol options, addresses, etc. An embodiment of the present invention also supports a dynamic network environment where e.g. network elements may join and leave a network, and which leads to that a previous decision is continuously re-evaluated and which can then further lead to re-configuration of the network elements in a network.

Overall, self-configuring network elements and networks significantly improve on the costs for managing networks, and an embodiment of the present invention can provide an important step towards lowering total cost of ownership.

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

It will also be appreciated by the person of skill in the art that various modifications may be made to the above-described embodiments without departing from the scope of the present invention as defined by the appended claims.

The invention claimed is:

1. A decentralised method of deciding a common configuration parameter in a network, the network comprising a plurality of designated nodes, the method comprising, at a designated node:
    making a local decision relating to the configuration parameter based upon information relating to the designated node's local operating environment;
    sending the local decision to one or more other designated nodes;
    receiving one or more corresponding local decisions made by one or more other designated nodes; and
    following such receipt, making a common decision relating to the configuration parameter based upon the local decision and the one or more received local decisions using a decision algorithm common to the designated nodes,
    wherein operating environment information for a node comprises a weight of that node, and wherein the step of making a common decision comprises adopting a decision made by the designated node having the highest weight.

2. The decentralised method of claim 1, further comprising receiving from at least one other node of the network information relating to the local operating environment of the at least one other node, and using the received information in making the local decision.

3. The decentralised method of claim 1, further comprising sending the common decision to a node that is not a designated node.

4. The decentralised method of claim 1, wherein the configuration parameter comprises at least one of: a routing protocol for use in the network; a network interface address; a signaling protocol for connection establishment; a protocol for mobility management; a codec; a link layer scheduling algorithm; and a transmission power.

5. The decentralised method of claim 1, wherein the local operating environment information comprises at least one of: the protocols supported by the node; a hardware specification of the node; links and/or interfaces between network nodes; one or more identities of the node; the number of nodes within the network; state information of the node, media and coding support and enforced policies; default routing parameters; and additional negotiated parameters.

6. The decentralised method of claim 1, further comprising sending the local operating environment information to at least one other designated node.

7. The decentralised method of claim 6, further comprising determining whether the sending of the information to the at least one other node would cause the information to cross a domain border, and sending the information only if not so determined.

8. The decentralised method of claim 6, further comprising sending the local operating environment information in response to a change occurring that affects the local operating environment information.

9. The decentralised method of claim 6, further comprising sending the local operating environment information only to another node within the same domain.

10. The decentralised method of claim 1, wherein the network comprises an IP network.

11. The decentralised method of claim 1, further comprising performing each of the steps at each designated node of the network.

12. The decentralised method of claim 1, further comprising applying the common configuration parameter by establishing a connection in dependence upon the common configuration parameter.

13. An apparatus for use as or in a node designated in a network to perform at least part of a decentralised method of deciding a common configuration parameter for the network, wherein the apparatus is configured to:
  make a local decision relating to the configuration parameter based upon information relating to a local operating environment of the node;
  send the local decision to one or more other designated nodes;
  receive one or more corresponding local decisions made by one or more other designated nodes; and
  following such receipt, make a common decision relating to the configuration parameter based upon the local decision and the one or more received local decisions using a decision algorithm common to the designated nodes,
  wherein operating environment information for a node comprises a weight of that node, and wherein the apparatus is further configured to adopt a decision made by the designated node having the highest weight.

14. The apparatus of claim 13, further configured to receive from at least one other node of the network information relating to the local operating environment of the at least one other node, and make the local decision in dependence upon the received information.

15. The apparatus of claim 13, further configured to send the common decision to a node that is not a designated node.

16. The apparatus of claim 13 further configured to send the local operating environment information to at least one other designated node.

17. The apparatus of claim 16, further configured to determine whether the sending of the information to the at least one other node would cause the information to cross a domain border, and means for sending the information only if not so determined.

18. The apparatus claim 13, further configured to apply the common configuration parameter by establishing a connection based upon the common configuration parameter.

* * * * *

UNITED STATES PATENT AND TRADEMARK OFFICE
CERTIFICATE OF CORRECTION

| | | |
|---|---|---|
| PATENT NO. | : 8,472,343 B2 | Page 1 of 1 |
| APPLICATION NO. | : 12/680363 | |
| DATED | : June 25, 2013 | |
| INVENTOR(S) | : Johnsson et al. | |

It is certified that error appears in the above-identified patent and that said Letters Patent is hereby corrected as shown below:

In the Specification

In Column 4, Line 7, delete "perforin" and insert -- perform --, therefor.

In the Claims

In Column 16, Line 29, in Claim 18, delete "apparatus claim" and insert -- apparatus of claim --, therefor.

Signed and Sealed this
Twenty-second Day of July, 2014

Michelle K. Lee
*Deputy Director of the United States Patent and Trademark Office*